Nov. 10, 1936. W. FERRIS ET AL 2,060,293
HYDRAULIC CHUCK OPERATING MECHANISM
Filed June 18, 1930  4 Sheets-Sheet 3

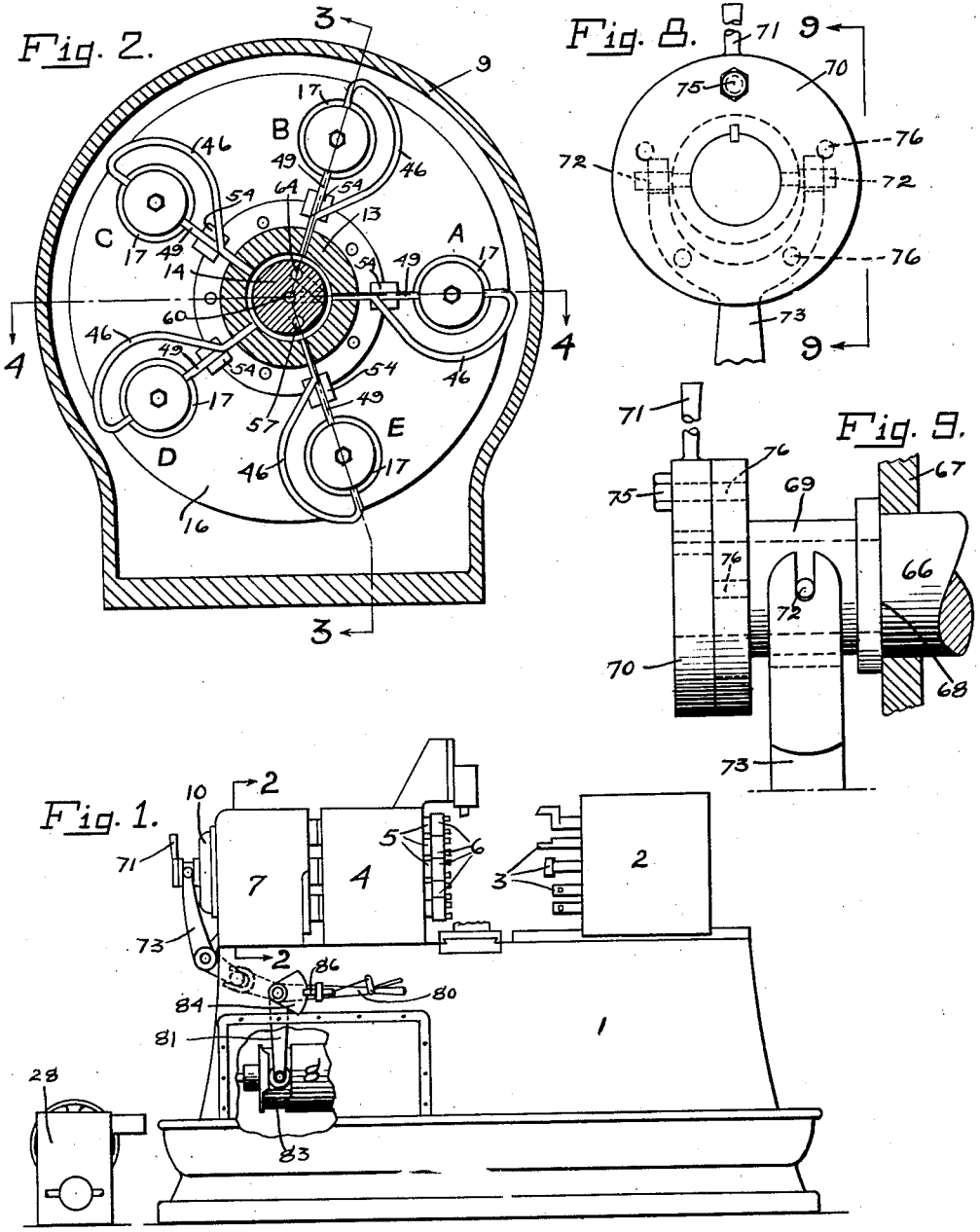

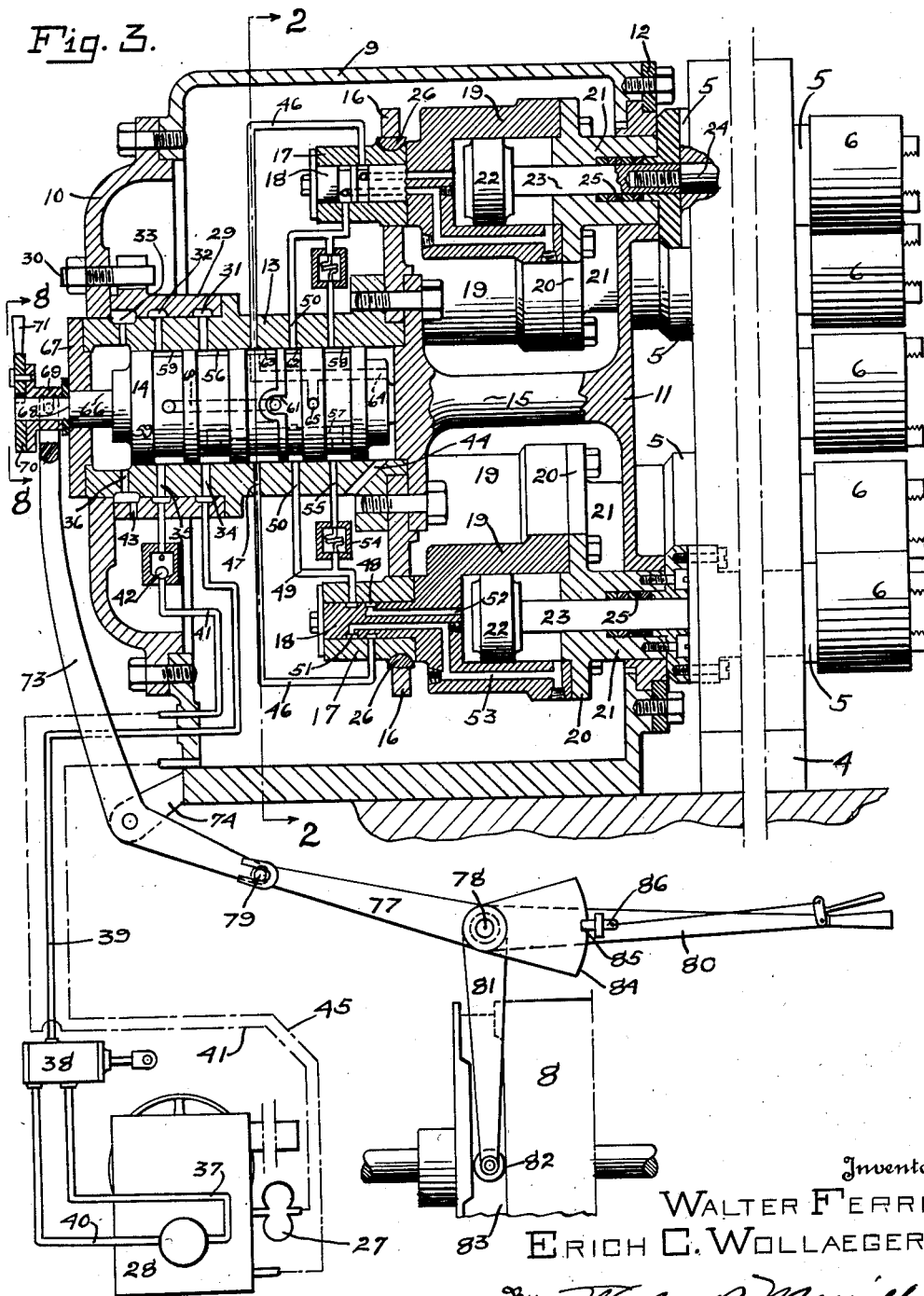

Inventor
WALTER FERRIS.
ERICH C. WOLLAEGER.

Attorney

Patented Nov. 10, 1936

2,060,293

UNITED STATES PATENT OFFICE 2,060,293

HYDRAULIC CHUCK-OPERATING MECHANISM

Walter Ferris, Milwaukee, Wis., and Erich C. Wollaeger, Cleveland, Ohio, assignors to The Oilgear Company, Milwaukee, Wis., a corporation of Wisconsin Application June 18, 1930, Serial No. 462,056

15 Claims. (Cl. 29—38)

This invention relates to chuck-operating mechanisms for multiple spindle machines.

The machine to which the invention is particularly adapted has a tool head which carries a number of tools, a spindle turret which carries a number of rotary spindles having work-holding chucks upon the ends thereof, a chuck operating mechanism for opening and closing the chucks, and mechanism for rotating the spindle turret intermittently to bring the chucks successively into registry with each of the tools.

The chuck-operating mechanism is ordinarily operated to open each chuck after the same arrives at a certain station to allow the finished article held thereby to be removed and replaced by an unfinished article.

The invention has as an object to provide a hydraulic chuck-operating mechanism which is positive and precise in operation.

Another object is to open and close the chucks at high speed by means of liquid supplied from one source and to hold the chucks closed by means of liquid supplied from another source.

Another object is to provide means to open the chuck at one station automatically and to open a chuck at any station manually.

Another object is to provide a chuck-operating mechanism having a single valve which is capable of operating all of the chucks on the machine.

According to the invention, each chuck is operated by a piston and a cylinder which are connected thereto, a relatively small volume of liquid at a holding pressure is supplied to all of the cylinders to hold the chucks closed, and a relatively large volume of liquid is supplied to one cylinder at a time to open and close the chuck connected to that cylinder without affecting the holding pressure in the other cylinders.

The invention further provides means for opening the chuck at any station and also a single valve for controlling the flow of liquid to all of the chuck cylinders.

A hydraulic chuck-operating mechanism embodying the invention is illustrated in the accompanying drawings in which the views are as follows:

Fig. 1 is an elevation of a multiple spindle lathe to which the invention has been applied.

Fig. 2 is a cross-sectional view through the chuck-operating mechanism, taken substantially on the line 2—2 of Figs. 1 and 3.

Fig. 3 is in part a longitudinal section, taken on the broken line 3—3 of Fig. 2, and in part a schematic drawing showing a variable displacement pump and a gear pump connected to the chuck-operating mechanism for supplying liquid thereto.

Fig. 8 is an end view of the valve shifter, as indicated by line 8—8 of Fig. 3.

Fig. 9 is a side view of the valve shifter, taken on the line 9—9 of Fig. 8.

Figure 4:
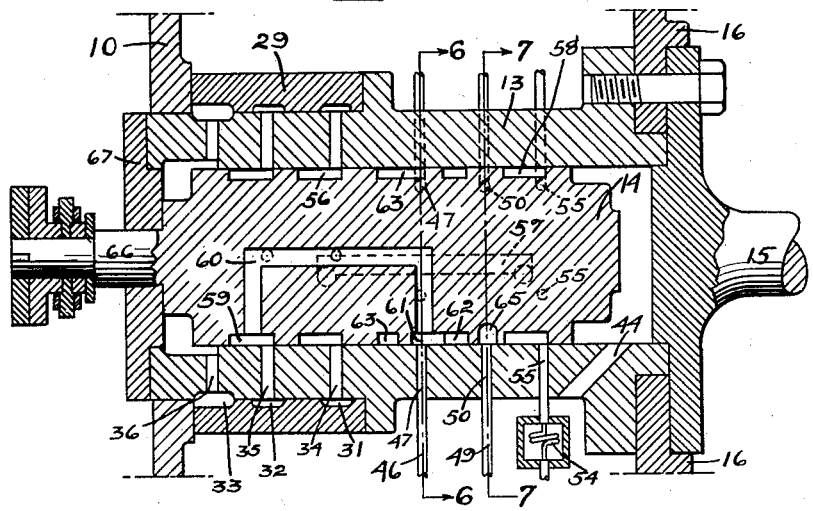
Fig. 4 is a sectional plan through the main operating valve, taken on the line 4—4 of Fig. 2 and showing the valve in position to open one of the chucks.

The invention is shown applied to a multiple spindle lathe, such as the Cleveland five-spindle chucking lathe shown in the catalog of the Cleveland Automatic Machine Company of Cleveland, Ohio, but the invention is not limited to this particular application.

This machine has a bed 1, a tool head 2 arranged thereon and provided with five tools 3, a spindle turret 4 arranged upon the bed 1 and provided with five spindles 5 having chucks 6 upon the outer ends thereof to hold the articles to be machined, a chuck-operating unit 7 arranged upon the bed 1 to open and close the chucks 6, and a cam drum 8 which controls the chuck-operating unit.

The spindles 5 are rotated continuously upon their individual axes and intermittently revolved about a common central axis from one station to another which correspond to the stations of the tools 3, and the cam drum 8 is rotated continuously in synchronism with the mechanism which intermittently revolves the spindles 5 from station to station.

Each chuck 6 rotates the article carried thereby and the tool head 2 is advanced to bring the tools 3 into engagement with the articles carried by the corresponding chucks to machine the same. The five articles are thus machined simultaneously but each tool ordinarily performs a different operation.

When the operations at all stations are completed, the spindles 5 are revolved to move the article carried by each chuck 6 to the next station where it is operated upon by the tool at that station.

After each chuck arrives at a certain station, which is generally termed the loading sation, the drum 8 actuates the chuck-operating unit to open that chuck and allow the article carried thereby to be removed and replaced by an unfinished article. The cam 8 then actuates the chuck-operating unit to close the chuck and secure the unfinished article therein.

The tool at the loading station has a shorter operation to perform than the other tools, in order to allow time for changing the article held by the chuck at that station, and this operation may be either the first or the last operation performed upon an article by the machine. If the former, each chuck is opened as soon as it arrives at the loading station and, if the latter, the chuck at the loading station is opened as soon as the tool completes its operation.

The machine thus far described is a standard machine having either a mechanical or a pneumatic chuck-operating unit and forms no part of the present invention which is directed to hydraulic mechanism for operating the chucks.

Figs. 1 to 9

The chuck-operating mechanism is arranged within a housing 9 which is carried by the bed 1 and closed at its rear end by a stationary bearing plate 10. The front end of the housing 9 is closed by a circular head 11 which is rotatable therein and held against axial movement by a ring 12 secured to the housing 9.

The cylinder 13 of an operating or control valve 14 has its rear end journaled in the bearing plate 10 and its forward end attached to the rear end of a support 15 which is coaxial with the head 11 and fixed thereto to rotate the cylinder 13 in unison therewith.

The support 15 also has a circular supporting plate 16 fixed to the rear end thereof which carries five hub bearings 17 in each of which the hub 18 of a cylinder 19 is journaled. Each cylinder 19 is closed at its rear end by the hub 18 and at its forward end by a cylinder head 20 which has a spindle 21 formed integral therewith and journaled in the head 11. The head 11, valve cylinder 13 and cylinders 20 are thus formed into a complete rotatable unit which has its rear end journaled in the bearing plate 10 and its forward end journaled in the front end of the housing 9.

Each spindle 21 is attached to one of the spindles 5 and the chuck 6 carried thereby is operated by a piston 22 which is arranged in the cylinder 19 and has its rod 23 connected to the operating rod 24 of the chuck 6. The operating rod 24 and the connection for attaching the spindle 21 to the chuck spindle 5 are parts of the spindle turret 4 and form no part of the present invention.

The pistons 22 are reciprocated to operate the chucks 6 by liquid supplied to the cylinders 19 under pressure, and leakage of liquid from the cylinders 19 is prevented by packing 25 which is arranged in the spindles 21 and encircles the piston rods 23.

The spindles 21 and the cylinders 19 are rotated by the chuck spindles 5 and the pistons 22 are rotated in unison therewith by the chuck-operating rods 24; the valve spindles 21 rotating in the head 11 and the hub 18 of the cylinders 19 rotating in the hub bearings 17 which are secured in the supporting plate 16 by keys 26.

The pistons 22 are moved to open and close the chucks 6 by a liquid, such as oil, under a comparatively low pressure and are acted upon by liquid under a comparatively high pressure to hold the chucks 6 closed.

The low pressure liquid may be supplied by a gear pump 27 and the high pressure liquid by a variable displacement pump 28 which has the characteristic of delivering the volume of oil required to maintain any predetermined pressure within the capacity of the pump. The pump 28 may be of the type disclosed in Patent No. 1,578,233, issued to Walter Ferris March 23, 1926, and the gear pump 27 may be incorporated therein as disclosed in Patent No. 1,619,200, issued to Walter Ferris March 1, 1927, or the gear pump 27 may be driven in conjunction with pump 28 and connected to the sump thereof as indicated diagrammatically in Fig. 3.

Liquid from the pumps 27 and 28 is delivered to the operating valve 14 through a delivery ring 29 which is journaled upon the valve cylinder 13 and held against rotation by a bolt 30 carried by the bearing plate 10. The ring 29 is provided upon its inner periphery with three annular grooves 31, 32 and 33 which register, respectively, with ports 34, 35, and 36 formed in the side walls of the cylinder 13.

The pump 28 delivers high pressure liquid to the valve cylinder 13 through a pipe 37, a three-way valve 38 and a pipe 39, the upper end of which is connected to the delivery ring 29 and communicates with the groove 31 and the port 34. The valve 38 is also connected to the intake of the pump 28 by a pipe 40 and may be operated to stop the delivery of liquid to the valve cylinder 13 and return the same directly to the pump.

The gear pump 27 delivers low pressure liquid to the valve cylinder 13 through a pipe 41 which is provided with a check valve 42 to protect the pump 27 from high pressure. The pipe 41 is connected at its upper end to the delivery ring 29 and communicates with the interior of the valve cylinder 13 through the groove 32 and the port 35.

Liquid in the rear end of the cylinder 13 may drain into the housing 9 through the ports 36, the groove 33 and a drain opening 43 which extends through the delivery ring 29 and registers with the groove 33. Liquid in the front end of the cylinder 13 may drain into the housing 9 through drain openings 44, which are formed in the side wall of the cylinder 13, and the liquid collected in the bottom of the housing 9 may drain into the sump of the pump 28 through a drain pipe 45.

The hub bearing 17 of each clutch cylinder 19 is connected to the valve cylinder 13 by a pipe 46, which has one end in communication with a port 47 in the wall of the cylinder 13 and its other end in communication with an annular groove 48 formed upon the periphery of the cylinder hub 18, and by a pipe 49 which has one end in communication with a port 50 in the wall of the cylinder 13 and its other end in communication with an annular groove 51 formed in the cylinder hub 18.

Low pressure liquid delivered through the pipe 46 to the groove 48 is conducted into the rear end of the cylinder 19 through a duct 52 to advance the piston 22 and open the clutch 6, and low pressure liquid delivered through the pipe 49 to the groove 51 is conducted into the front end of the cylinder 19 through a duct 53 to retract the piston 22 and close the chuck 6.

The groove 51 is also connected to the cylinder 13 through a choke coil 54 which is connected between the pipe 49 and a port 55 in the wall of the cylinder 13. High pressure liquid delivered through the port 55 and the choke coil 54 increases the pressure in the cylinder 19 and causes an article to be firmly gripped by the jaws of the chuck 6 after the same have been closed by the low pressure liquid delivered through the pipe 49.

Figure 5:
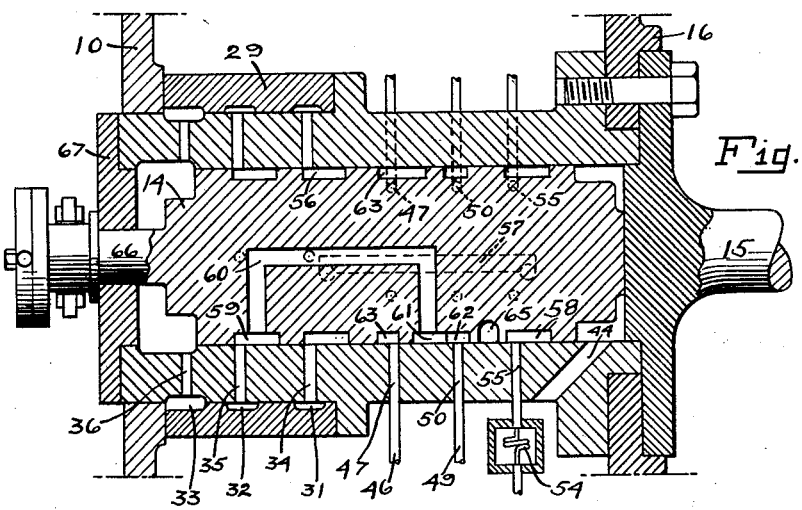
Fig. 5 is a view similar to Fig. 4 but showing the valve in position to hold all of the chucks closed.
Figure 6:
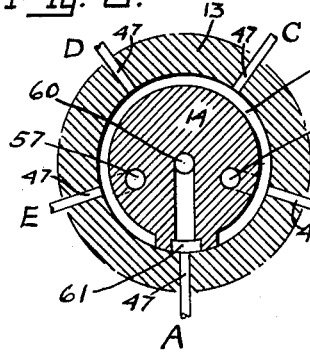
Fig. 6 is a transverse section through the valve taken on a line 6—6 Fig. 4.
Figure 7:
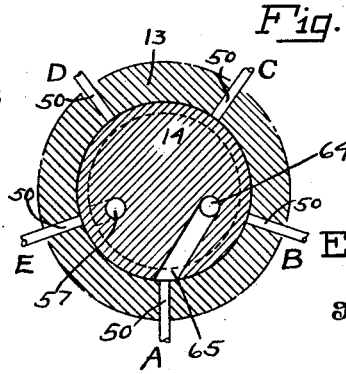
Fig. 7 is a transverse section through the valve, taken on a line 7—7 of Fig. 4.

The liquid delivered to the chuck cylinders 19 and the liquid discharged therefrom flows through ducts formed in the valve 14 which controls the operation of the chuck pistons 22. When the valve 14 is advanced as shown in Figs. 3 and 5, all of the pistons 22 are retracted and all of the chucks 6 are held closed and, when the valve 14 is retracted as shown in Fig. 4, one chuck only is open and the other chucks are held closed.

The chuck at any station may be opened manually by operating the valve 14 which is ordinarily adjusted to automatically open each chuck as the same arrives at a certain station. As shown, the valve is adjusted to open the chuck at station A.

The ports 34 are always in registry with an annular groove 56 which is formed in the periphery of the valve 14 and connected by a duct 57 to an annular peripheral groove 58 which is always in registry with the ports 55 so that high pressure liquid may be delivered to all of the cylinders 19 at all times.

The ports 35 are always in registry with an annular groove 59 which is formed in the periphery of the valve 14 and connected by a duct 60 to a recess 61 which is formed in the periphery of the valve 14 in radial alignment with station A and opens into an annular groove 62.

When the valve 14 is advanced and all of the chucks 6 are closed, the groove 62 is in registry with all of the ports 50 and, when the valve 14 is retracted, the groove 62 moves out of registry with the ports 50 and the recess 61 moves into registry with the port 47 at station A, so that liquid may be delivered by the gear pump 27 to the rear end of the cylinder 19 at that station to open the chuck 6.

The ports 47 are normally in registry with an annular groove 63 from which a discharge duct 64 leads through the body of the valve 14 and opens into the cylinder 13 at the forward end thereof. The drain groove 64 also has an inlet 65 which is arranged in radial alignment with station A and is normally out of registry with any port, but it registers with the port 50 at station A when the valve 14 is retracted so that liquid may be discharged from the front end of the cylinder 19 at that station.

The valve 14 is moved axially by its stem 66 which extends through the head 67 of the cylinder 13 and has the outer part thereof reduced in diameter to provide a shoulder 68. A thrust collar 69 is journaled upon the reduced part of the stem 66 and held against axial movement relatively thereto by the shoulder 68 and an index plate 70 which is fixed upon the outer end of the stem 66 and provided with a handle 71 for rotating the same.

Two pins 72 are secured to the thrust collar 69 upon opposite sides thereof and engaged by the bifurcated upper end of an operating lever 73 which is pivoted intermediate its ends upon a bracket 74 carried by the housing 9. The lever 73 holds the thrust collar 69 against rotation and the valve 14 is held against rotation by a pin 75 which is carried by the index plate 70 and adapted to be inserted in any one of five holes 76 which are formed in the thrust collar 69 and correspond to the normal positions of the five chucks.

The lever 73 is actuated by a lever 77 which has one end fixed upon a shaft 78 carried by the bed 1 and its other end bifurcated and engaging a pin 79 carried by the lower end of the lever 73.

The lever 77 may be actuated by a hand lever 80, which is fixed to the shaft 78, or by a cam lever 81 which is journaled upon the shaft 78 and provided at its lower end with a roller 82 which rides in the cam groove 83 of the drum 8. The cam lever 81 actuates the lever 77 through an arm 84 which is fixed to the lever 81 and provided with a notch 85 normally engaged by a latch 86 carried by the hand lever 80.

When the roller 82 is moved toward the rear of the machine by the cam groove 83, the cam lever 81 will rock the shaft 78 and swing the lever 77 to actuate the operating lever 73 and cause the same to retract the valve 14.

The gear pump 27 will then deliver liquid under pressure to the cylinder 19 at station A through the pipe 41, check valve 42, delivery ring 29, port 35, groove 59, duct 60 and recess 61 to the port 47 at station A and thence through the pipe 46, groove 48, and duct 52 to the rear end of the cylinder 19 to force the piston 22 outwardly and open the chuck 6 at that station.

As the piston 22 moves forwardly, the liquid in the forward end of the cylinder 19 is expelled through the duct 53, groove 51, pipe 49, port 50, inlet 65 and drain duct 64 into the front end of the cylinder 13 from which it drains through the drain openings 44 into the base of the housing 9 and is returned to the sump of the pump 28 through the drain pipe 45.

The rear ends of all of the other cylinders 19 are open to the drain as the groove 63 is of sufficient width to remain in registry with all of the other ports 47 when the port 47 at station A is brought into registry with the recess 61 by retracting the valve 14.

Also, the groove 58 has sufficient width to remain in registry with all of the ports 55 so that high pressure liquid is delivered through the choke coils 54 to the front ends of all of the cylinders 19 to hold all of the chucks closed except the one at station A. The discharge of liquid through the choke coil 54 at station A is so small that it does not affect the operation of the piston 22 at that station nor lower the holding pressure in the cylinders at the other stations.

The cam drum 8 is rotating continuously and the cam groove 83 is so arranged as to allow sufficient time to remove the finished article from the chuck at station A and replace the same with an unfinished article.

The cam lever 81 is then moved in the opposite direction by the cam groove 83 to advance the valve 14 and thereby move the inlet 65 out of registry with the port 50 at station A and the groove 62 into registry therewith and the recess 61 out of registry with the port 47 at station A and the groove 63 into registry therewith.

Low pressure liquid will now flow through the groove 62, port 50, pipe 49, groove 51, and duct 53 to the front end of the cylinder 19 and retract the piston 22 to close the chuck and secure the work therein. After the piston 22 has been retracted by the low pressure liquid, the high pressure liquid delivered through the choke coil 54 will build up the pressure in the forward end of the cylinder 19 and cause the piston 22 to be forced rearwardly under high pressure and firmly grip the article in the chuck 6. The article is then in condition to be acted upon by the tool 3.

When the piston 22 at station A is retracted, the liquid in the rear end of the cylinder 19 is expelled through the duct 52, groove 48, pipe 46, port 47, groove 63, duct 64 and into the front end of the cylinder 13 from which it is discharged through the drain 44.

In case it is desired to open the chuck at any of the other stations, the pin 75 is removed and the valve 14 rotated by means of the handle 71 until the pin 75 can be inserted in the hole 76 corresponding to that station.

The recess 61 and the inlet 65 will then register, respectively, with the port 47 and the port 50 at that station when the valve 14 is retracted. Consequently, the chucks will open and close after the same arrive at this station and remain closed at all of the other stations.

It it is desired to remove or adjust the article at any station other than the loading station, the valve 14 is rotated as described above, the latch 86 is withdrawn from the notch 85, and the hand lever 80 is operated to actuate the lever 73 and retract the valve 14.

The recess 61 and the inlet 65 are thus moved, respectively, into registry with the port 47 and the port 50 at that station, and the piston 22 is retracted to open the chuck. After the article has been removed or adjusted, the hand lever 80 may be operated to advance the valve 14 and close the chuck.

Figure 10:
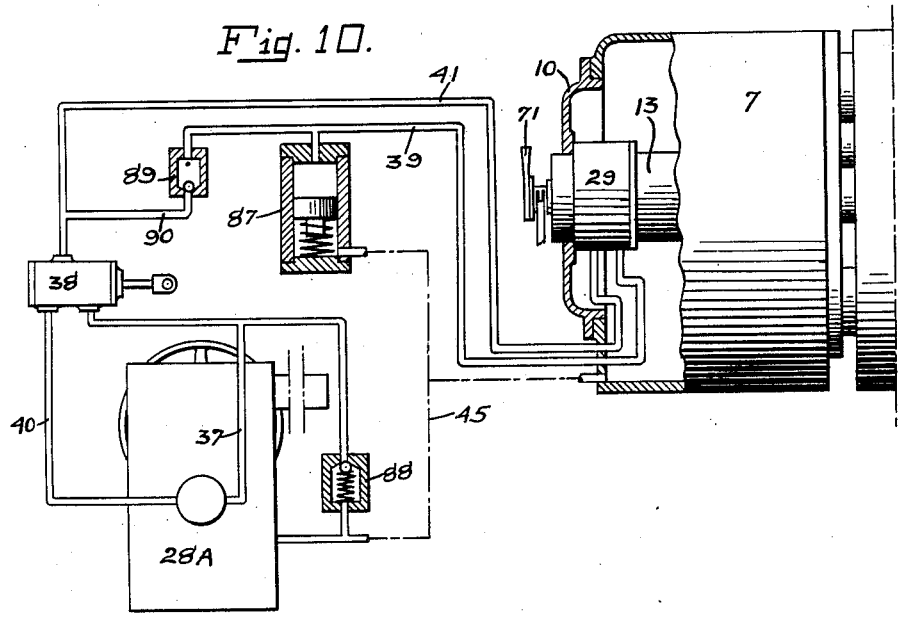
Fig. 10 is a schematic drawing showing an arrangement wherein the chucks are opened and closed by liquid supplied from a pump and held closed by liquid supplied from an accumulator.
Figure 11:
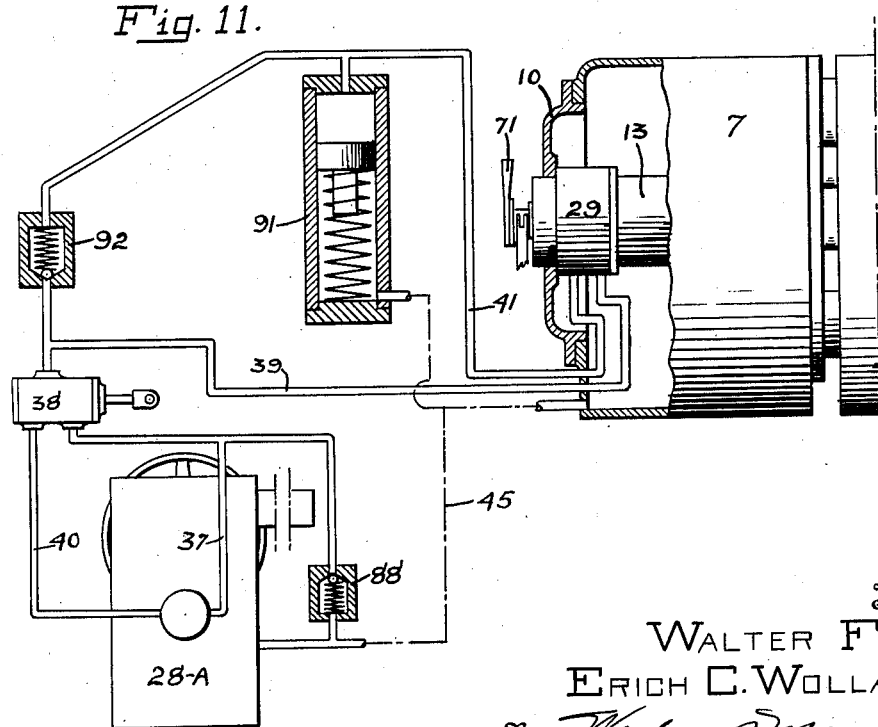
Fig. 11 is a schematic drawing showing an arrangement wherein the chucks are opened and closed by liquid supplied from an accumulator and held closed by liquid supplied from a pump.

*Figs. 10 and 11*

The arrangements shown in these figures differ from the arrangement shown in Figs. 1 to 9 only in employing a pump and an accumulator instead of two pumps as the two sources of pressure, and like parts have been indicated by like reference characters.

In the arrangement shown in Fig. 10, the chucks are opened and closed by liquid supplied from a high pressure pump 28—A and are held closed by liquid supplied from an accumulator 87.

The valve 38 may be employed to direct the output of the pump 28—A into the return pipe 40 when the machine is idling, as previously described, and the pump 28—A may be either a variable delivery pump or a constant delivery pump. If a constant delivery pump is employed, excess liquid is returned to the pump through a high pressure relief valve 88 which is connected between the delivery pipe 37 and the return pipe 45 and adjusted to open at a predetermined pressure.

The chucks are held closed by liquid supplied through the pipe 39 and the chuck at the loading station is opened and closed by liquid supplied through the pipe 41, as previously described.

The pipe 41 is connected to the valve 38 and the entire output of the pump 28—A is available for opening and closing the chuck at the loading station.

The pipe 39 is connected to the accumulator 87 and also to a check valve 89 which is connected to the pipe 41 by a pipe 90. Liquid delivered by the pump 28—A thus passes into the pipes 39 and 41 to hold the chucks closed and to charge the accumulator 87 to a predetermined pressure.

When the valve 14 is operated to open and close the chuck at the loading station, the pressure in the pipe 41 drops momentarily, due to the sudden demand upon the pump 28—A for an increased volume of liquid, and the check valve 89 closes to prevent the pressure in the pipe 39 from dropping. The accumulator 87 maintains the pressure in the pipe 39 and in the chuck cylinders at the other stations.

After the chuck at the loading station has been closed, the pressure in the pipe 41 increases to the predetermined maximum and the accumulator 87 is recharged.

The pump 28—A thus supplies liquid at a predetermined pressure to hold all of the chucks closed and the relatively large volume required to open and close one chuck at high speed, and the accumulator supplies a relatively small volume of liquid at the predetermined pressure to hold the four chucks closed when one chuck is open.

In the arrangement shown in Fig. 11, the chucks are held closed by liquid supplied through the pipe 39 from the pump 28—A and the chuck at the loading station is opened and closed by liquid supplied through the pipe 41 from an accumulator 91.

The pipe 39 is connected directly to the valve 38 and the pipe 41 is connected to the accumulator 91 and is also connected to the valve 38 through a high pressure resistance valve 92 which is adjusted to open at a pressure slightly lower than the pressure at which the relief valve 88 opens.

When the valve 14 is operated to open and close the chuck at the loading station, liquid is delivered from the accumulator 91 to the chuck cylinder at that station and the pump 28—A maintains a constant pressure in the chuck cylinders at the other stations equal to the pressure required to open the resistance valve 92.

Only a small part of the output of the pump 28—A is required to maintain this holding pressure and the balance of the output passes through the resistance valve 92 to assist the liquid supplied from the accumulator 91 in opening and closing the chucks at the loading station. Thus a small accumulator will suffice.

When the chuck at the loading station has been closed, the pump 28—A recharges the accumulator 91 which is then in condition to open and close the next chuck when the same arrives at the loading station.

The invention herein set forth is susceptible of various modifications and adaptations without departing from the scope thereof as hereafter claimed.

The invention is hereby claimed as follows:

1. The combination, with a machine having a number of work-holding chucks movable from station to station, of a hydraulic chuck-operating mechanism comprising a cylinder and a piston connected to each of said chucks for operating the same, means for supplying liquid continuously in limited volume and at a holding pressure to each of said cylinders to hold said chucks closed, and means for supplying liquid in larger volume to the cylinder at one of said stations to open and close the chuck at that station without interrupting the delivery of said limited volume of liquid or affecting the holding pressure in the cylinders at the other stations.

2. The combination, with a source of fluid under pressure and a machine having a number of chucks revoluble about a common axis and operated by pistons arranged in cylinders connected to said chucks, of means for opening and closing said chucks comprising a valve cylinder rotatable in synchronism with said chuck cylinders and having an inlet connected to said source and outlets connected to said chuck cylinders, a normally non-rotatable valve arranged in said valve cylinder to control said inlet and said outlets and having passageways to connect said inlet to said outlets and a drain for the passage of fluid discharged from said chuck cylinders, and means for moving said valve axially to control the flow of fluid from said source to said chuck cylinders and thereby control the movement of said pistons to open and close said chucks.

3. The combination, with a source of fluid under pressure and a machine having a number of chucks intermittently revoluble from station to station about a common axis and operated by pistons arranged in cylinders connected to said chucks of means for opening and closing said chucks comprising a valve cylinder rotatable in synchronism with said chuck cylinders and having an inlet connected to said source and outlet connected to said chuck cylinders, a normally non-rotatable valve arranged in said valve cylinder to control said inlet and said outlets and having passageways to connect said inlet to said outlet and a drain for the passage of fluid discharged from said chuck cylinders, and means for moving said valve to one position to direct fluid from said source to one end of each of said chuck cylinders and hold said chucks closed and for moving said valve to a second position to direct fluid to the other end of the chuck cylinder at one of said stations to open the chuck at that station.

4. The combination, with a source of fluid under pressure and a machine having a number of chucks intermittently revoluble from station to station about a common axis and operated by pistons arranged in cylinders connected to said chucks, of means for opening and closing said chucks comprising a valve cylinder rotatable in synchronism with said chuck cylinders and having an inlet connected to said source and outlets connected to said chuck cylinders, a normally non-rotatable valve arranged in said valve cylinder to control said inlet and said outlets and having passageways to connect said inlet to said outlets and a drain for the passage of fluid discharged from said chuck cylinders, automatic means for moving said valve axially to one position to direct fluid from said source to one end of each of said chuck cylinders and hold said chucks closed and for moving said valve to a second position to direct fluid to the other end of the chuck cylinder at one of said stations to open the chuck at that station, and manual means for rotating said valve to change the station at which the chuck will be opened upon the automatic operation of said valve.

5. The combination, with a source of fluid under pressure and a machine having a number of chucks intermittently revoluble from station to station about a common axis and operated by pistons arranged in cylinders connected to said chucks, of means for opening and closing said chucks comprising a valve cylinder rotatable in synchronism with said chuck cylinders and having an inlet connected to said source and outlets connected to said chuck cylinders, a normally non-rotatable valve arranged in said valve cylinders to control said inlet and said outlets and having passageways to connect said inlet to said outlet and a drain for the passage of fluid discharged from said chuck cylinders, automatic means for moving said valve axially to one position to direct fluid from said source to one end of each of said chuck cylinders and hold said chucks closed and for moving said valve to a second position to direct fluid to the other end of the chuck cylinder at one of said stations to open the chuck at that station, manually operable means for rotating said valve to a new position, and manually operable means for moving said valve axially to open and close a chuck at a different station.

6. The combination, with a source of liquid under pressure and a machine having a number of spindles intermittently revoluble from station to station about a common axis and provided with work-holding chucks, of a hydraulic chuck operating mechanism comprising a cylinder carried by each of said spindles, pistons arranged in said cylinders and connected to said chucks for opening and closing the same, means for delivering liquid to the cylinder at a predetermined station to open and close the chuck at that station, and means for supplying liquid to all of said cylinders to hold the chucks at all other stations closed including a choke connected to the cylinders at said predetermined station to limit the flow of liquid through said supplying means to said cylinder whereby a holding pressure is maintained in all other cylinders.

7. The combination, with a source of liquid under pressure and a machine having a number of spindles intermittently revoluble from station to station about a common axis and provided with work-holding chucks, of a hydraulic chuck-operating mechanism comprising a cylinder carried by each of said spindles, pistons arranged in said cylinders and connected to said chucks for opening and closing the same means for connecting one end of each of said cylinder to said source to supply liquid thereto for holding said chucks closed, means for releasing the pressure in the cylinder at one of said stations, means for connecting the other end of that cylinder to said source to supply liquid thereto for opening the chuck at that station, and means for selecting the station at which a chuck may be opened.

8. The combination, with two sources of liquid under pressure and a machine having a number of spindles intermittently revoluble from station to station about a common axis and provided with work-holding chucks, of a hydraulic chuck-operating mechanism comprising a cylinder carried by each of said spindles, pistons arranged in said cylinders and connected to said chucks for opening and closing the same, a valve cylinder revoluble in synchronism with said chuck cylinders and having inlets connected to both of said sources and outlets connected to said chuck cylinders, a normally non-rotatable valve arranged in said valve cylinder to control said inlets and outlets and having passageways to connect said inlets to said outlets and a drain for the passage of liquid discharged from said chuck cylinders, and means for moving said valve axially to one position to direct the liquid from both of said sources to the closing end of said chuck cylinders to close said chucks and for moving said valve to a second position to direct fluid from one of said sources into the releasing end of the chuck cylinder at one of said stations to open the chuck at that station and to maintain the other cylinders in communication with the other source of liquid to hold the other chucks closed.

9. The combination, with two sources of liquid under pressure and a machine having a number of spindles intermittently revoluble from station to station about a common axis and provided with work-holding chucks, of a hydraulic chuck-operating mechanism comprising a cylinder carried by each of said spindles, pistons arranged in said cylinders and connected to said chucks for opening and closing the same, a valve cylinder revoluble in synchronism with said chuck cylinders and having inlets connected to both of said sources and outlets connected to said chuck cylinders, a normally non-rotatable valve arranged in said valve cylinder to control said inlets and said outlets and having passageways to connect said inlets to said outlets and a drain for the passage of liquid discharged from said chuck cylinders, automatic means for moving said valve axially to one position to direct the liquid from both of said sources to the closing end of said chuck cylinders to close said chucks and for moving said valve to a second position to direct fluid from one of said sources into the releasing end of the chuck cylinder at one of said stations to open the chuck at that station and to maintain the other cylinders in communication with the other source of liquid to hold the other chucks closed, and manually operated means for rotating said valve to change the station at which a chuck will be opened upon the automatic operation of said valve.

10. The combination, with two sources of liquid under pressure and a machine having a number of spindles intermittently revoluble from station to station about a common axis and provided with work-holding chucks, of a hydraulic chuck-operating mechanism comprising a cylinder carried by each of said spindles, pistons arranged in said cylinders and connected to said chucks for opening and closing the same, a valve cylinder revoluble in synchronism with said chuck cylinders and having inlets connected to both of said sources and outlets connected to said chuck cylinders, a normally non-rotatable valve arranged in said valve cylinder to control said inlets and said outlets and having passageways to connect said inlets to said outlets and a drain for the passage of liquid discharged from said chuck cylinders, automatic means for moving said valve axially to one position to direct the liquid from both of said sources to the closing end of said chuck cylinders to close said chucks and for moving said valve to a second position to direct fluid from one of said sources into the releasing end of the chuck cylinder at one of said stations to open the chuck at that station and to maintain the other cylinders in communication with the other source of liquid to hold the other chucks closed, manually operatable means for rotating said valve to a new position, and manually operatable means for moving said valve axially to open and close the chucks.

11. The combination, with a source of liquid under pressure and a chucking mechanism having a rotary work-holding chuck, of a bearing having ducts connected to said source, a cylinder connected to said chuck to rotate therewith and journaled in said bearing and having ducts communicating with the ducts in said bearing to deliver liquid from said source to the interior of said cylinder, a piston arranged in said cylinder and actuated by liquid to operate said chuck, and a housing arranged around said cylinder and connected to said source to collect liquid escaping from said ducts and said cylinder and return the same to said source.

12. The combination, with a source of liquid under pressure and a chucking mechanism having a rotary work-holding chuck, of a cylinder connected to said chuck to rotate therewith, a piston arranged within said cylinder and connected to said chuck to operate the same, a hub carried by said cylinder and having ducts communicating with the interior thereof, a bearing surrounding said hub and having ducts communicating with the ducts in said hub and connected to said source to direct liquid into said cylinder to actuate said piston, and a housing arranged around said cylinder, and connected to said source to collect liquid escaping from said ducts and said cylinder and return same to said source.

13. The combination, with a machine having a number of cylinders and a piston arranged in each cylinder, of means for supplying relatively large volumes of liquid to said cylinders selectively to operate said pistons individually, means for supplying relatively small volumes of liquid at a holding pressure to all of said cylinders to hold said pistons in operated positions after the same have been operated by said large volume means, and a choke connected to each cylinder and included in said small volume means to limit the volume of liquid delivered therethrough to each of said cylinders to thereby allow one of said pistons to be operated by liquid delivered through said large volume means without affecting the holding pressure in any other cylinder.

14. The combination, with a source having a limited capacity for supplying liquid under pressure and a chucking mechanism having a number of independently rotatable chucks, of a cylinder and a piston connected to each of said chucks and rotatable therewith, and means including a choke coil for delivering liquid from said source to said cylinders for actuating said pistons to operate said chucks.

15. The combination, with two sources of liquid under pressure and a chucking mechanism having a number of independently rotatable chucks revoluble about a common axis, of a cylinder and a piston connected to each of said chucks and rotatable therewith, a valve connected to both of said sources to control the flow of liquid from said sources to said cylinders, means connecting said cylinders to said valve to direct liquid from one of said sources to said cylinders for operating said chucks, and means including choke coils for connecting each of said cylinders to said valve to direct liquid from the other of said sources to said cylinders for holding said chucks closed.

ERICH C. WOLLAEGER.
WALTER FERRIS.